United States Patent [19]

Carteau et al.

[11] Patent Number: 5,283,879
[45] Date of Patent: Feb. 1, 1994

[54] PROTECTED METHOD FOR FAST WRITING OF DATA FOR MASS MEMORY APPARATUS

[75] Inventors: Daniel Carteau, Paris; Philippe Schreck, Maurepas, both of France

[73] Assignee: Bull, S.A., Paris, France

[21] Appl. No.: 631,722

[22] Filed: Dec. 19, 1990

[30] Foreign Application Priority Data

Dec. 22, 1989 [FR] France ............... 89 17111

[51] Int. Cl.$^5$ ............... G06F 12/00; G06F 13/00
[52] U.S. Cl. ............... 395/425; 395/400; 364/DIG. 1; 364/268.3; 364/268.9; 364/273.4; 364/269.2; 371/66; 371/8.1
[58] Field of Search ............... 395/425, 400; 371/8.1, 371/8.2, 9.1, 10.1, 66; 364/268.3, 268.9, 273.4, 269.2, 200 MS File, 900 MS File

[56] References Cited

U.S. PATENT DOCUMENTS

| | | | |
|---|---|---|---|
| 3,964,056 | 6/1976 | Charpentier et al. | 340/172.15 |
| 4,228,496 | 10/1980 | Katzman et al. | 371/66 |
| 4,819,159 | 4/1989 | Shipley et al. | 371/9.1 |
| 5,034,915 | 7/1991 | Styrna et al. | 371/66 |
| 5,036,455 | 7/1991 | Atwood | 371/66 |
| 5,088,021 | 2/1992 | McLaughlin et al. | 371/9.1 |
| 5,109,505 | 4/1992 | Kihara | 371/66 |
| 5,140,592 | 8/1992 | Idleman et al. | 371/9.1 |
| 5,163,052 | 11/1992 | Evans et al. | 371/9.1 |
| 5,202,980 | 4/1993 | Morita et al. | 371/9.1 |

FOREIGN PATENT DOCUMENTS 2486291 8/1982 France .

OTHER PUBLICATIONS

IBM Tech. Disclosure Bulletin, vol. 32, No. 2 Jul. 1989 (pp. 378-380).

Primary Examiner—Joseph L. Dixon
Assistant Examiner—Frank J. Asta
Attorney, Agent, or Firm—Kerkam, Stowell, Kondracki & Clarke

[57] ABSTRACT

A protected method of fast writing of information for at least one mass memory apparatus ($DMM_1$) belonging to an information processing system including at least one central host ($H_1$, $H_2$), two control units ($UC_1$, $UC_2$) with independent electrical power supplies ($ALIM_1$, $ALIM_2$, $BAT_1$, $BAT_2$) connected to a first and second parallel bus ($B_1$, $B_2$) is disclosed wherein the method is characterized in that, if the host ($H_1$, $H_2$) is connected to each of the two buses via at least one first host adaptor ($HA_1$, $HA_2$) belonging to the first control unit ($UC_1$, $UC_2$) and the mass memory ($D_1$–$D_5$) is connected to each of the two buses via a first and a second mass memory adaptor ($DA_1$, $DA_2$) belonging to the first and second control unit, respectively, which include a first and a second memory buffer ($MTD_1$, $MTD_2$), respectively, I—the block of data to be written is memorized in the first host buffer ($MTH_1$, $MTH_2$) and memory buffer ($MTD_1$, $MTD_2$);

II—the first mass memory adaptor ($DA_1$, $DA_2$) reserves the mass memory ($D_1$–$D_5$, $D_6$–$D_{10}$);

III—the mass memory adaptor ($DA_1$) then informs the host adaptor ($HA_1$) of this, which host adaptor then sends an acknowledgement signal to the central host ($H_1$);

IV—the operation of writing the block in its entirety is performed in the mass memory under the direction of the first mass memory adaptor ($DA_1$) or the second, if the first is defective. The invention is applicable to mass memory subsystems.

26 Claims, 6 Drawing Sheets

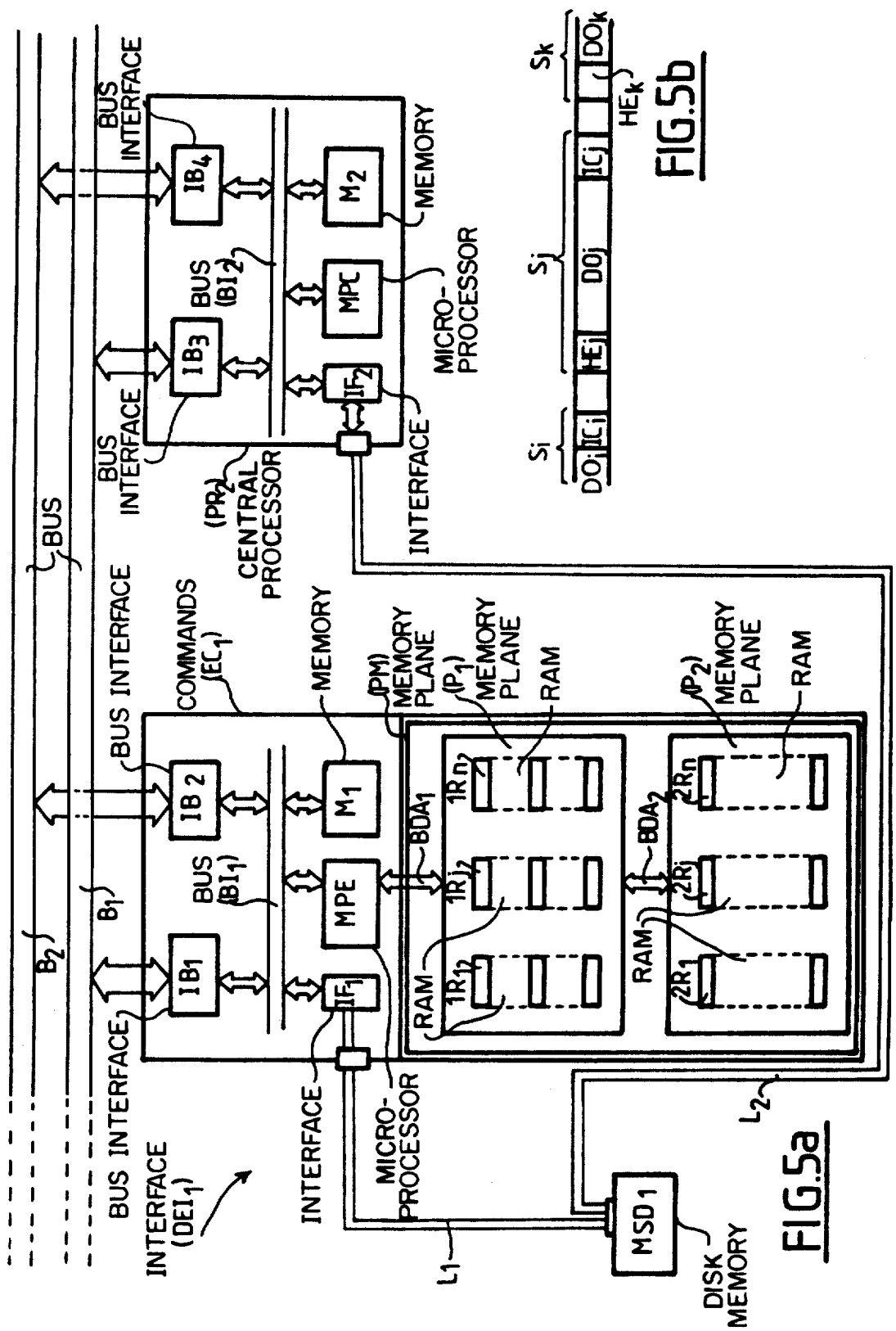

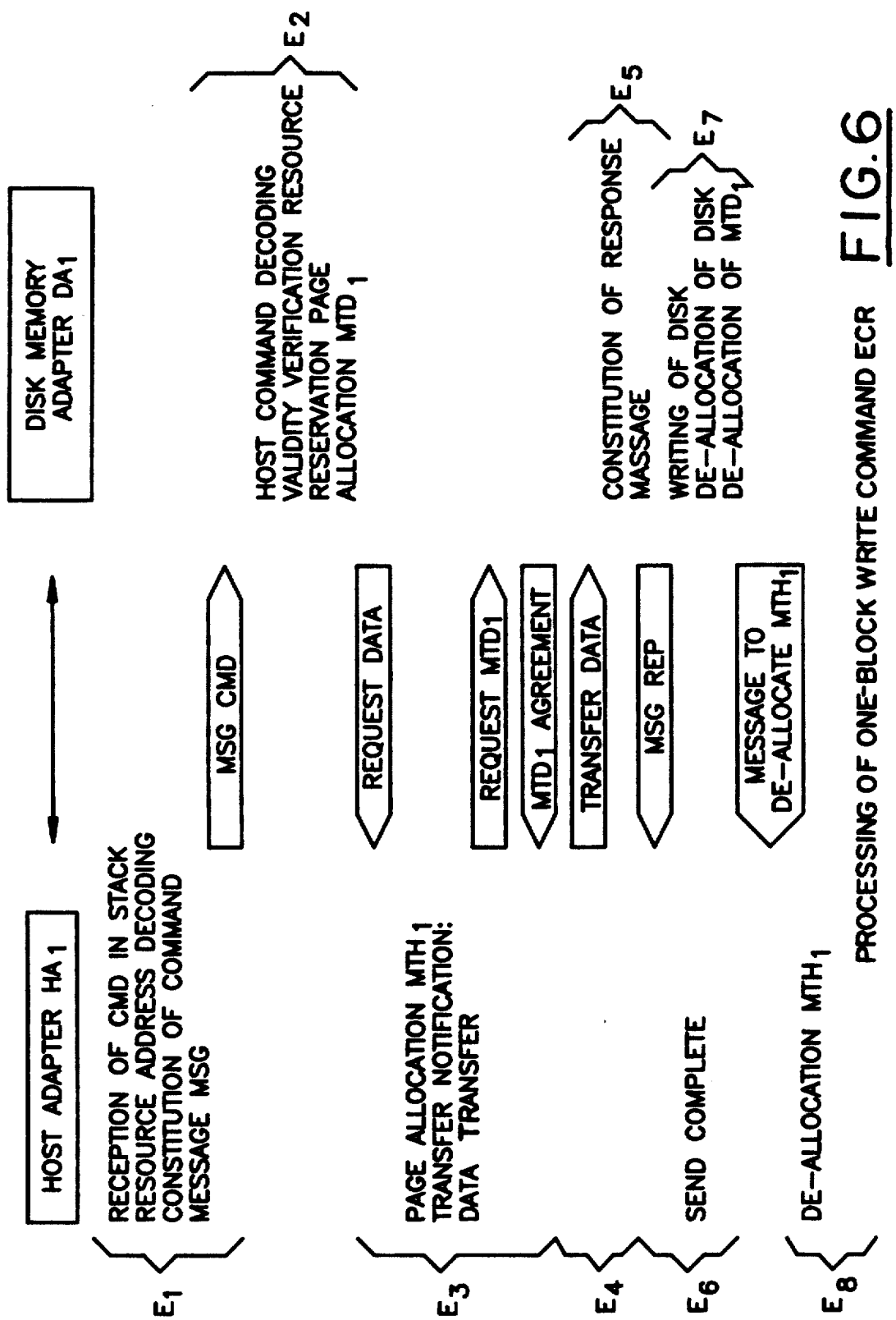

PROTECTED METHOD FOR FAST WRITING OF DATA FOR MASS MEMORY APPARATUS

The present invention relates to a protected method of fast writing of information for at least one mass memory apparatus belonging to an information processing system including at least one central host system. It is applicable more particularly to writing of information in a set of rotary disk memories.

It is known that an information processing system comprises a central unit, also called a central host, embodied by at least one central processing unit, and a main memory to which this processor is connected; various peripherals; and an input/output processor that assures control of the exchange of data between the memory and its various devices.

Peripheral control units or controllers are associated with the various peripherals and assure the physical transfer of data between the central host and the peripherals associated with these various controllers.

Generally, all the functional constituent elements of an information processing system are connected to the same parallel bus, which assures the transport of the data among the various boards that these elements have and also assures the supply of electrical power to them.

One of the most widely used buses of this type at present is the Multibus II (registered trademark of Intel Corporation). Its architecture is structured around a main bus of the parallel type, standardized by the Institute of Electrical and Electronic Engineers under IEEE standard 1296.

As for the peripherals, mass memories, such as rotary magnetic disk memories, are especially important. They are very widely used in information processing because they enable both the storage of very large quantities of information and relatively fast access to it. Their mean access time is on the order of 20 to 25 ms. The highest-powered disk memories on the market have capacities that exceed 1 gigabyte.

When the central host wishes for the information to be written in a given disk memory, the following problem arises: For reasons of cost, volume, and ease of management of the work by this host system, the central memory of the host bus has very limited capacity (several megabytes) compared with the rotary disk memory. On the other hand, the access time to the information contained in the central memory is very short, on the order of one or two hundred nanoseconds.

Consequently, when the host system wishes to write information on a disk of a disk memory, it must save the corresponding data in its central memory until the recording has been completed in the entire disk in question. This has the advantage of assuring the protection of the data; on the other hand, it makes some of the central memory of the host system unavailable for some 20 to 25 ms on average, which is considerable, in view of the high speed of current processors, and hence expensive.

To overcome this disadvantage, an interpolated memory is disposed between the host system and the disk memory or memories, as can be seen in FIG. 1a, which schematically shows the version described in French Patent 2.486.291 filed on Jul. 4, 1980. The interpolated memory MI is disposed between the host system H and a disk memory MD.

The interpolated memory MI includes a first interface circuit $I_1$ for interfacing with the host system H; a second interface circuit $I_2$ for interfacing with the disk memory MD; a device DC for commanding the interpolated memory, connected to the two interface circuits $I_1$ and $I_2$, on the buffer memory MT, on the other, respectively.

When the host system H seeks to write information into the disk memory MD, the information passes under the direction of the command device DC, via the first interface circuit $I_1$ in the command device itself, to the buffer memory MT, where it is stored. The information waits there to be transferred, under the direction of the command device DC, via the interface circuit $I_2$, to the disk memory MD, when the memory locations in one of the rotary disks of this memory become available. As soon as the set of information that the host system H seeks to write in the disk memory MD has been transferred to the buffer memory MT, the host system can assign the locations in its central memory that have been made available by the transfer of this information to writing other information. It will be appreciated that from the moment when the data are transferred to the interpolated memory MI, it is the command device DC of that memory that carries out the writing of the applicable information in the disk memory MD.

The major disadvantage of the interpolated memory apparatus MI shown in FIG. 1a is as follows: When for any reason such as, for example, a defect of any of the circuits comprising the interpolated memory MI, a power failure for it, maintenance work, etc., the interpolated memory MI fails and the data written in it are lost. This means that the operation of writing the data in the disk memory MD is not performed in complete security, i.e., the data is not protected. To overcome this disadvantage, in current practice an apparatus inspired by that shown in FIG. 1b, which is equivalent to IBM's mass memory subsystem 3390 is used.

Between the host system H and a set of disk memories $D_1-D_5$, this apparatus includes a high-capacity cache memory MC (several tens of megabytes), and a nonvolatile memory MNV associated with an emergency battery power supply. The cache memory and the nonvolatile memory are connected to the same internal bus BI that the controller CNT of the disk memories $D_1-D_5$ is also connected to.

When the host system H wishes to write given data into one of the disk memories $D_1-D_5$, the information is first written in the cache memory MC and nonvolatile memory MNV, and the information is then written on the disk in question by seeking the information in the cache memory.

The major disadvantage of the apparatus shown in FIG. 1b is that a cache memory is used, the unit price of which per megabyte is a dozen times greater than the unit price per megabyte of the disks. Moreover, the nonvolatile memory is also very expensive and is therefore not sold on the market except for high-end equipment.

The present invention makes it possible to overcome these disadvantages by proposing a method of fast, protected writing of information for a mass memory apparatus that is relatively simple and much less expensive than the methods used in the systems of the prior art.

According to the invention, the method of fast writing of information for at least one mass memory apparatus belonging to an information processing system including at least one central host, two control units for independent electrical power supply, respectively having at least a first and a second central processor and connected to a first and second parallel bus, is characterized in that, if the host is connected to each of the two buses via at least one first host adaptor belonging to the first control unit and including a first host buffer, and the mass memory is connected to each of the two buses via a first and a second mass memory adaptor belonging to the first and second control unit, the two mass memory adaptors respectively including a first and a second buffer associated with the mass memories and known as a memory buffer, the following successive operations are performed:

I—the block of data that the host wishes to write is memorized in the first host buffer and then in the first memory buffer by dialog between the host and the host adaptor, on the one hand, and between the host adaptors and the mass memory adaptors on the other;

II—the first mass memory adaptor requests reservation of the mass memory with a view to writing the aforementioned block there;

III—as soon as the reservation thereof is obtained, the first mass memory adaptor informs the host adaptor of this, and the host adaptor then sends an acknowledgement signal to the central host;

IV—the operation of writing the block in its entirety is performed in the mass memory under the direction of the first mass memory adaptor in all cases when it is functioning properly, and by the second mass memory adaptor when the first is defective.

Thus the method according to the invention uses the buffer memories of the host adaptors and mass memory adaptors, buffer memories that are present aside from their specific use for the method according to the invention. They are in any case present in the host adaptors and mass memory adaptors, which are the interface circuits normally used to connect the central host and the mass memories to buses of the Multibus II type.

Hence the method according to the invention makes it possible to avoid using specific boards that have to be added, as is the case for example for the apparatus of FIG. 1b.

The mass memory apparatus using the method according to the invention is an intelligent subsystem, one that is redundant because it is constituted by two interconnected controllers, and it alone is capable of proposing a relatively inexpensive fast writing method of this kind that enables assuring the inscription of data into mass memories in complete security, i.e., fully protected, regardless of any malfunctions or accidents that may affect some or all of the apparatus.

Further characteristics and advantages of the present invention will become more apparent from the ensuing detailed, non-limiting description and from the accompanying drawings.

In the drawings:

FIG. 1, comprising FIGS. 1a and 1b, shows mass memory apparatus using writing methods for mass memories, according to the prior art;

FIG. 5, comprising FIGS. 5a and 5b, shows the diagram of the main constituent elements of an electronic mass memory and of the central processor belonging to the first and second control unit, respectively, of the mass memory apparatus according to the invention, and FIG. 5b shows how the data are written both inside an electronic mass memory and inside a rotary-disk mass memory;

FIG. 6 shows the flow chart for the dialog between the host adaptor and the mass memory adaptor that enables the implementation of the writing method according to the invention.

DETAILED DESCRIPTION

Figure 1A:
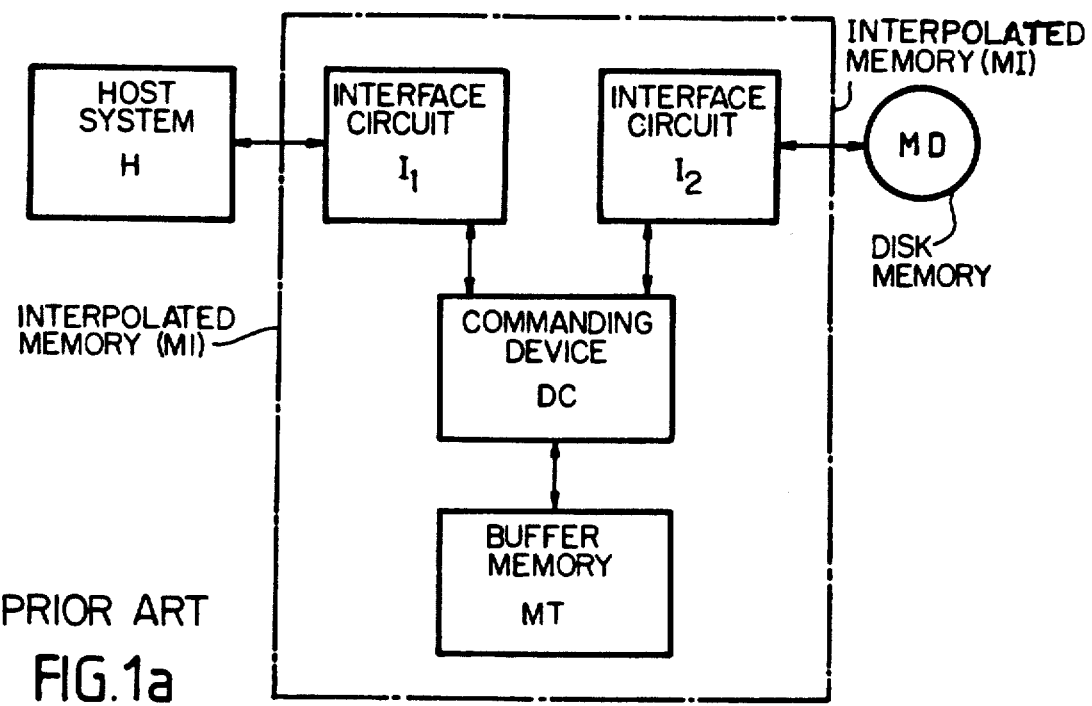
Figure 1B:
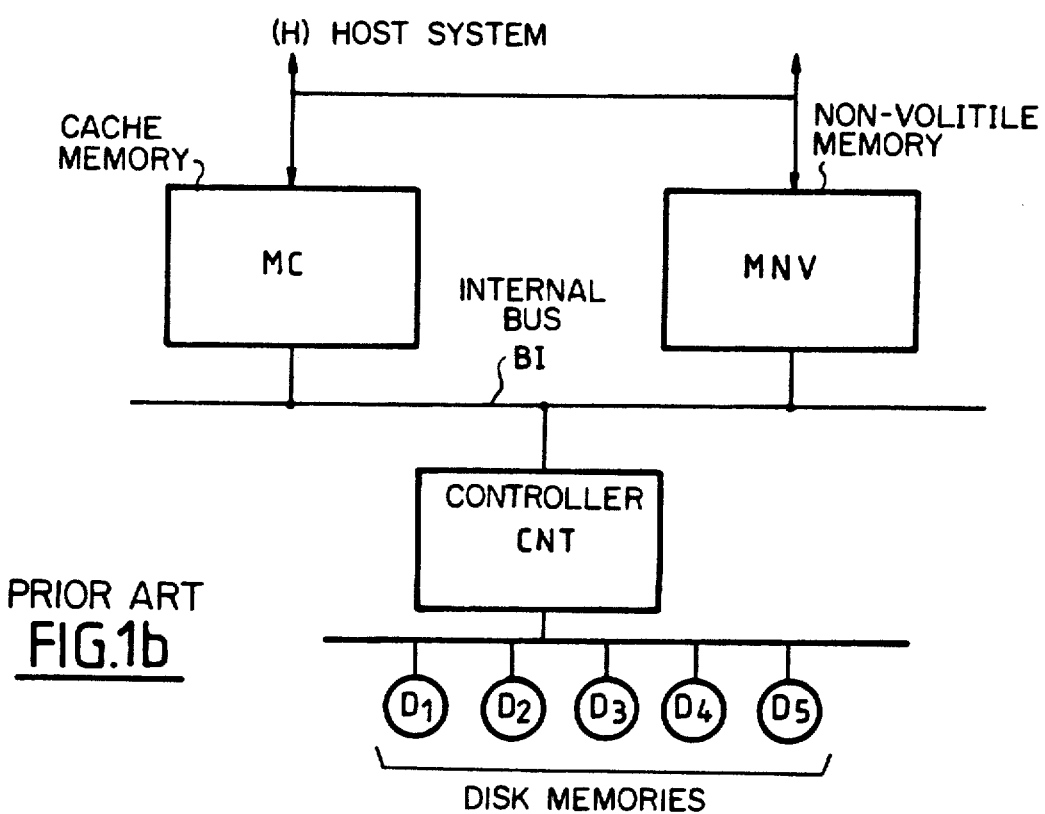
Figure 2:
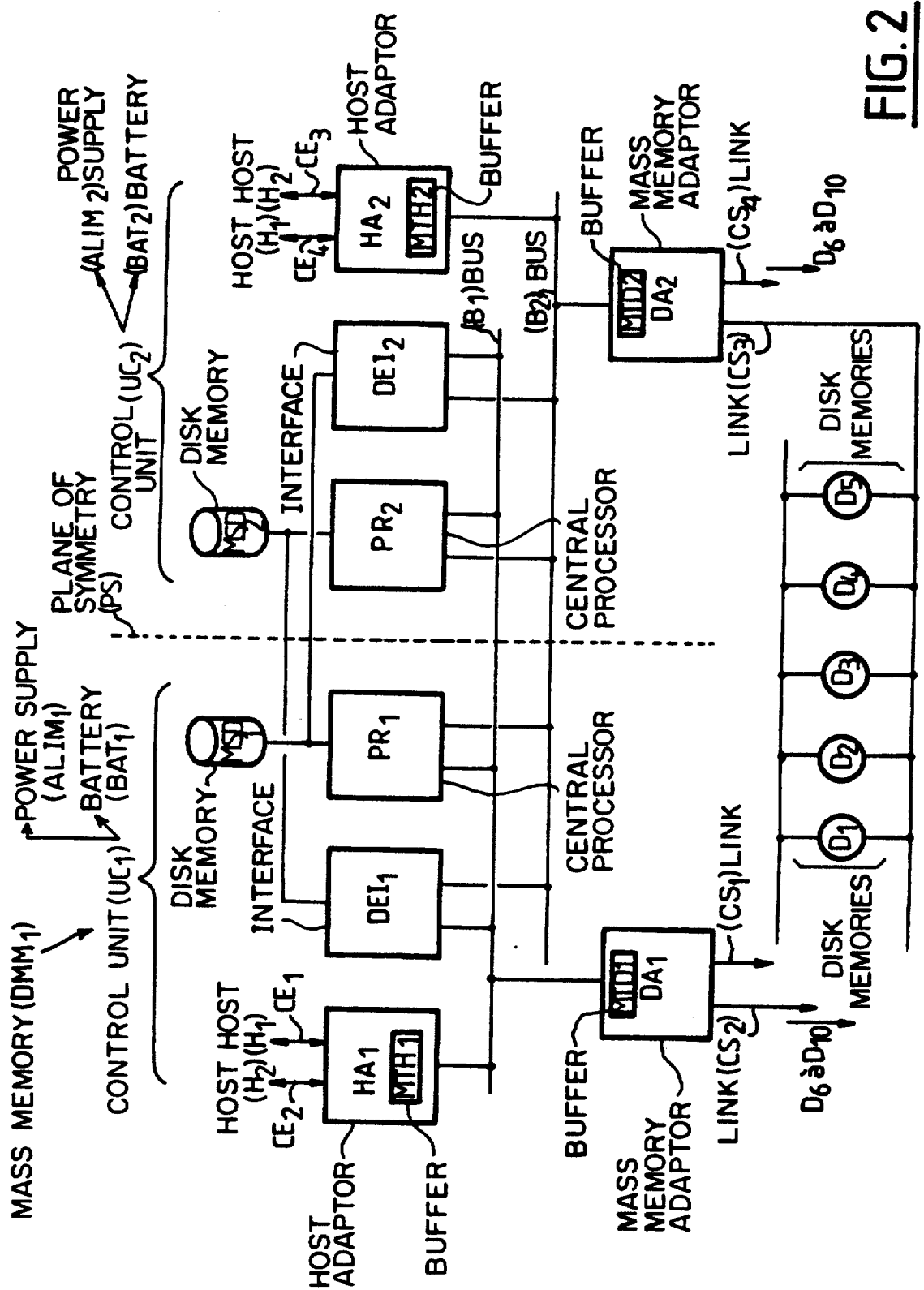
FIG. 2 is a diagram of a first exemplary embodiment of a mass memory apparatus employing the writing method according to the invention.

FIG. 2 will be addressed first. It shows the first exemplary embodiment $DMM_1$ of the mass memory apparatus implementing the protected fast writing method according to the invention.

This apparatus $DMM_1$ can be considered a subsystem of the mass memory belonging to a much larger information processing system, the central portion of which for example includes two host systems $H_1$ and $H_2$.

Preferably, the apparatus $DMM_1$ includes two identical control units, that is, $UC_1$, occupying the left-hand portion of FIG. 2, and $UC_2$, occupying the right-hand portion.

The architecture of the apparatus $DMM_1$ is constructed around two identical buses that are parallel to one another, preferably of the Multibus II type, designated as $B_1$ and $B_2$.

It is seen that the two buses have a central zone where they completely face one another, and two lateral zones where they do not face one another. The two control units $UC_1$ and $UC_2$ are strictly identical and symmetrical to one another with respect to a plane of symmetry PS.

The first control unit $UC_1$ is supplied with electrical power by a first power supply $ALIM_1$ and is connected to a first emergency electrical power supply $BAT_1$, embodied by a battery.

The second control unit $UC_2$ is also supplied by a second power supply $ALIM_2$ that is independent of the first and is connected to a second emergency power supply $BAT_2$.

The first control unit $UC_1$ includes the following:
  a first central processor $PR_1$;
  a first interface board $DEI_1$;
  a host adaptor $HA_1$ including a first buffer memory or host buffer, $MTH_1$;
  a mass memory adaptor $DA_1$ (disk memories $D_1$–$D_5$), including a first buffer memory more commonly known for simplicity as a first memory buffer $MTD_1$, this adaptor being called here a disk adaptor for the sake of simplicity;
  the backup disk memory $MSD_1$.

Similarly, the second control unit $UC_2$ includes the second central processor $PR_2$, the second interface board $DEI_2$, the host adaptor $HA_2$ including the second host buffer $MTH_2$, the second disk adaptor $DA_2$ including the second memory buffer $MTD_2$, and the second backup disk memory $MSD_2$.

The first and second disk adaptors $DA_1$ and $DA_2$ are connected via respective links $CS_1$ and $CS_3$ to a set of disk memories, only five of which are shown in FIG. 2, that is, the disk memories $D_1$–$D_5$. The first and second disk adaptors $DA_1$ and $DA_2$ can also be connected respectively via links $CS_2$ and $CS_4$ to a second set of disk memories $D_6$–$D_{10}$, which are not shown in FIG. 2 for the sake of simplicity.

The links $CS_1$–$CS_4$ are links of the IPI-2 type, standardized by both ANSI (American National Standards Institute) and ISO (International Standards Organization).

The first host adaptor $HA_1$ is connected to a first host $H_1$ via a first linking channel $CE_1$, and to a second host $H_2$ via a second linking channel $CE_2$.

Similarly, the second host adaptor $HA_2$ is connected to a second host $H_2$ via first linking channel $CE_3$, and to a first host $H_1$ via a second linking channel $CE_4$.

The first linking channels $CE_1$ and $CE_3$ of the first and second host adaptors $HA_1$ and $HA_2$ have priority over the second linking channels $CE_2$ and $CE_4$.

The four linking channels $CE_1$–$CE_4$ are of the IPI-3 type standardized by both ANSI and ISO.

The constituent elements of the first control unit, that is, $PR_1$, $DEI_1$, $HA_1$, $DA_1$, and $MSD_1$, are identical and symmetrical to the corresponding elements of the second control unit $UC_2$, that is, $PR_2$, $DEI_2$, $HA_2$, $DA_2$, and $MSD_2$.

The four constituent elements $DEI_1$, $PR_1$, $PR_2$, $DEI_2$ are connected simultaneously to both buses $B_1$ and $B_2$, in the central portion of the buses where the buses face one another.

The constituent elements $HA_1$ and $DA_1$ of the first control unit $UC_1$ are connected to the first bus $B_1$, while the corresponding elements $HA_2$ and $DA_2$ of the second control unit $UC_2$ are connected to the second bus $B_2$.

The first backup disk memory $MSD_1$ is connected both to the first central processor $PR_1$ and to the second interface board $DEI_2$.

Similarly, the second backup disk memory $MSD_2$ is connected to both the second central processor $PR_2$ and the second interface board $DEI_1$. Thus both backup disk memories $MSD_1$ and $MSD_2$ are accessible by both the first and second control unit $UC_1$ and $UC_2$ simultaneously.

In FIG. 2 (and in FIG. 3 as well), the mass memory apparatus $DMM_1$ (or $DMM_2$ in FIG. 3) is represented as two sets each of five disk memories, but it will be appreciated that the mass memory apparatus may contain a lower number, or more often a higher number of disk memories; this number may be as high as several dozen or even a few more than 100.

Figure 3:
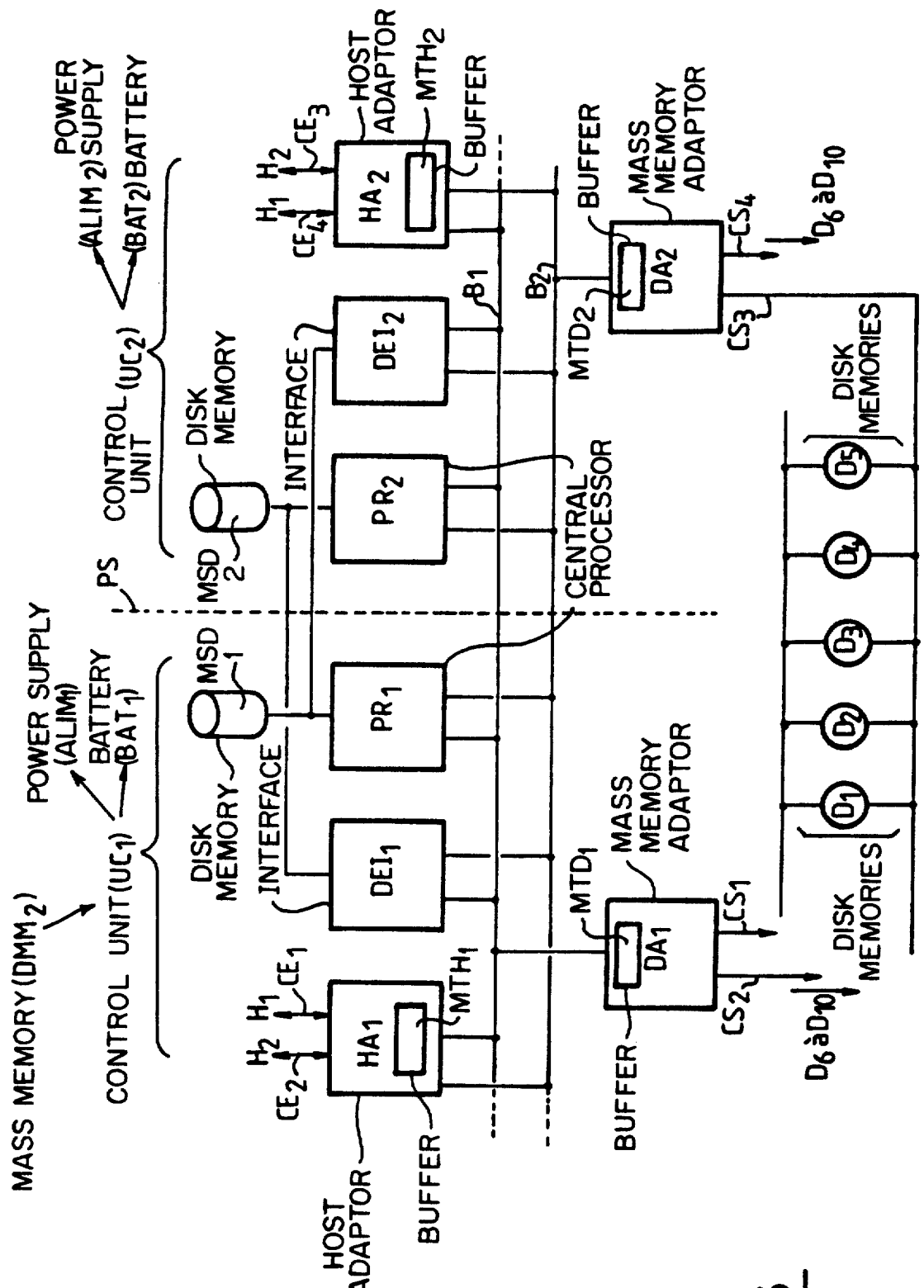
FIG. 3 is a diagram showing a second exemplary embodiment of a mass memory apparatus using the writing method according to the invention.

The second exemplary embodiment of the mass memory apparatus according to the invention, $DMM_2$ shown in FIG. 3, is identical in its broadest outlines to the first exemplary embodiment $DMM_1$ shown in FIG. 2, but with the difference that all of the two buses $B_1$ and $B_2$ face one another, and that the first and second host adaptors $HA_1$ and $HA_2$ are connected to these two buses simultaneously, while the second mass memory adaptors $DA_1$ and $DA_2$ are connected separately, one to the bus $B_1$ and the other to the bus $B_2$, respectively. The consequences of this slight difference in structure will become more apparent from the ensuing description relating to the functioning of these mass memory apparatuses according to the invention.

The two central processors $PR_1$ and $PR_2$ are figuratively the foremen of the various elements belonging to each of the control units $UC_1$ and $UC_2$. They load implementation programs of the various elements included in these control units into them, so that the control units can perform the functions assigned to them. The processors $PR_1$ and $PR_2$ will look for these programs, which for example are stored in the backup rotary disk memories $MSD_1$ and $MSD_2$. In that case these latter memories have a dual function, that is, first to back up information not yet stored and waiting to be written in the rotary disk memories $D_1$–$D_5$ (in case of any malfunction making $DA_1$ and $DA_2$ unavailable), and second to store the aforementioned implementation programs. However, these programs could be stored in a special disk memory, or system disk memory, connected to both the processor $PR_1$ and the processor $PR_2$.

Figure 4:
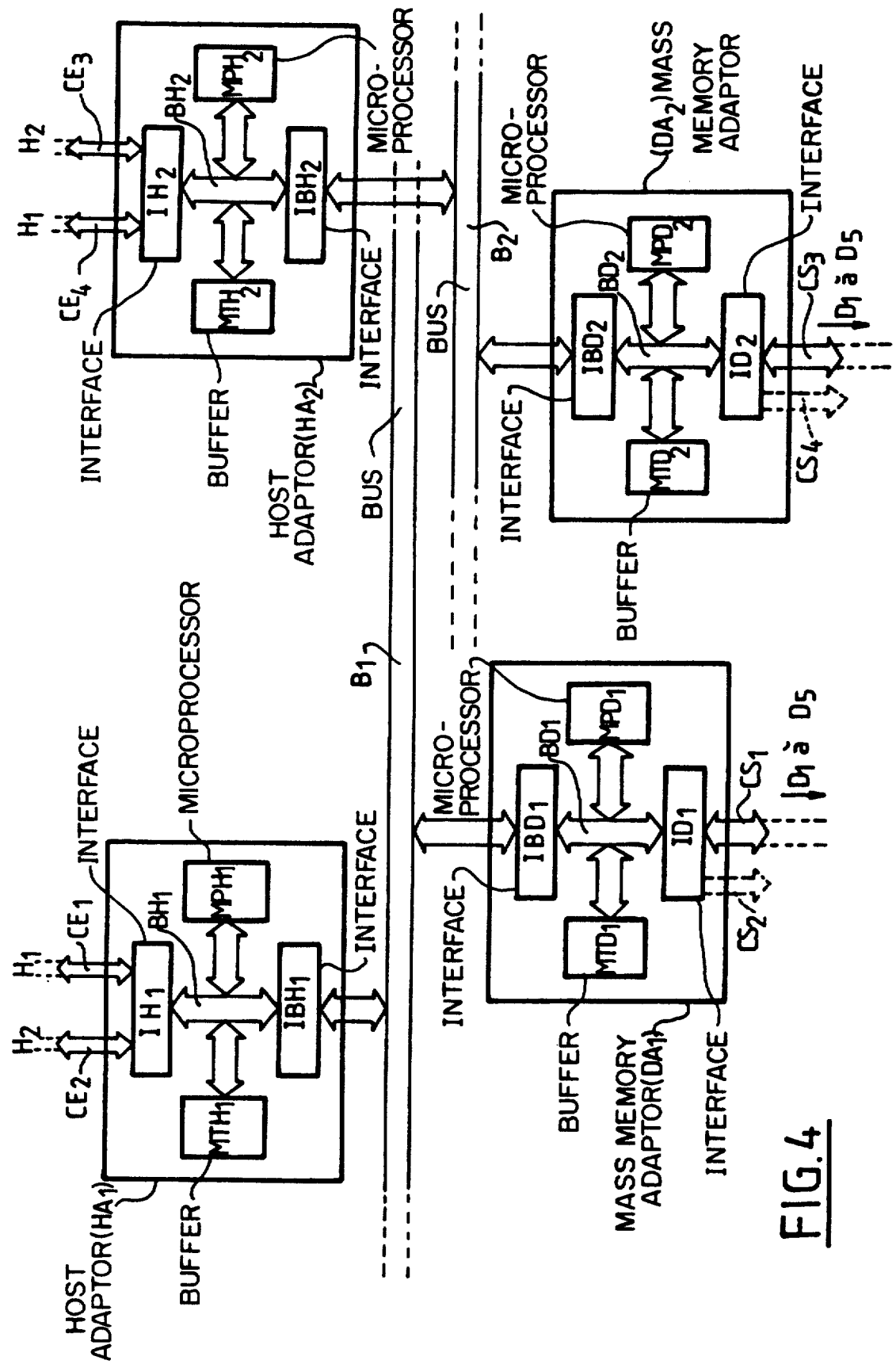
FIG. 4 is a detailed diagram showing the structure of the host adaptors and mass memory adaptors belonging to the mass memory apparatus according to the invention.

Further details of the structure of the host adaptors $HA_1$, $HA_2$ and disk adaptors $DA_1$ and $DA_2$ can be found in FIG. 4.

The first host adaptor $HA_1$ includes the following:
an interface $IH_1$ for linking the two host systems $H_1$ and $H_2$ via linking channels $CE_1$ and $CE_2$, this linking interface being defined by the IPI-2 standard;
the host buffer memory, or for simplicity the host buffer $MTH_1$;
the microprocessor $MPH_1$;
the interface $IBH_1$ for connection with the Multibus II bus $B1$, this interface being defined by the aforementioned standard IEEE 1296, and for example constituted by a coprocessor of the VL 82c389 type (made by Intel) communicating by message mode with the other constituent functional elements of the mass memory apparatus $DMM_1$ of the invention.

Similarly, the second host adaptor $HA_2$ includes the interface $IH_2$ for linking the two host systems $H_1$ and $H_2$ via the two channels $CE_3$ and $CE_4$, the second host buffer memory $MTH_2$, the microprocessor $MPH_2$, and the interface $IBH_2$ for connection with the Multibus II bus $B2$. It is clear that the equivalent constituent elements of each of the first and second host adaptors $HA_1$ and $HA_2$ perform analogous functions.

The respective constituent elements of the first and second host adaptors communicate with one another via the internal buses $BH_1$ and $BH_2$ of the microprocessors $MPH_1$ and $MPH_2$.

The structure of the first and second disk adaptors $DA_1$ and $DA_2$ is similar to the structure of the host adaptors.

Thus the first adaptor $DA_1$ includes an interface $IBD_1$ for connection with the bus $B_1$ defined by IEEE standard 1296 mentioned above; a buffer memory for the disk memories, more simply called a memory buffer, $MTD_1$; the microprocessor $MPD_1$; and finally the interface $ID_1$ for linking with the disk memories $D_1$–$D_5$ and $D_6$–$D_{10}$ via the IPI-2-type linking channels $CS_1$ and $CS_2$ (these interfaces are defined by the aforementioned standard IPI-2).

Similarly, the second disk adaptor $DA_2$ includes the interface $IBD_2$ for connection with the bus $B_2$ defined by the aforementioned IEEE standard 1296; the host buffer $MTD_2$; the microprocessor $MPD_2$; and the interface $ID_2$ for linking with the two sets of disk memories $D_1$–$D_5$ and $D_6$–$D_{10}$ via the linking channels $CS_3$ and $CS_4$.

The various constituent elements of the disk adaptors $DA_1$ and $DA_2$ communicate with one another via the internal buses $BD_1$ and $BD_2$ of the microprocessors $MPD_1$ and $MPD_2$.

The broad outlines of the writing method according to the invention, employed by the mass memory apparatus $DMM_1$ shown in FIGS. 2–4, are as follows:

1—When the host system $H_1$, for example, wishes to write a block of data into any of the disk memories of the set $D_1$–$D_5$, this block of data to be written is memorized first in the first host buffer $MTH_1$ and then in the first memory buffer $MTD_1$, by successive dialog between the host $H_1$ and the host adaptor $HA_1$, under the direction, with respect to the latter, of the microprocessor $MPH_1$, and also between the host adaptor $HA_1$ and the disk adaptor $DA_1$, under the respective direction of the microprocessors $MPH_1$ and $MPD_1$. More precisely, to perform this operation I, the three following suboperations are performed:

1. the host system $H_1$ sends a request for writing a block of data to the host adaptor (for example via the channel $CE_1$);
2. the host adaptor $HA_1$ requests the host $H_1$ to transfer the block of data to be written;
3. this block is memorized in its entirety first in the host buffer $MTH_1$ and then also in the memory buffer $MTD_1$ (the block of data to be written travel over the internal bus $BH_1$, the interface $IBH_1$, the Multibus II bus $B_1$, the interface $IBD_1$ and the internal bus $BD_1$).

II—The disk adaptor $DA_1$, under the direction of the microprocessor $MPD_1$, requests the reservation of the disk memory $D_1$–$D_5$ that is addressed by the host $H_1$ (the host in its writing request, indicates which disk memory is addressed, that is, the disk memory where the data block is to be written), with a view to writing the aforementioned block.

III—As soon as this reservation is obtained by agreement with the disk memory addressed, the disk adaptor (the microprocessor $MPD_1$) informs the host adaptor $HA_1$ (microprocessor $MPH_1$) of this, and the latter then sends an acknowledgement signal to the host system $H_1$. The host system is then free to perform other operations even though the disk adaptor $DA_1$ has not yet organized the operation of writing the aforementioned block of data in the disk memory in question.

IV—The operation of writing the block is performed under the control of the microprocessor $MPD_1$.

The program for dialog between the host adaptor $HA_1$ and the host system $H_1$ is loaded, upon initialization of the mass memory apparatus $DMM_1$, by the central processor $PR_1$ into the microprocessor $MPH_1$ (or into the memory associated with it, which is not shown in order to simplify FIG. 4). Similarly, the program of dialog between the host adaptors and disk adaptors is loaded by the central processor $PR_1$ into the microprocessors $MPH_1$ and $MPD_1$. The program for writing the block of data into any of the disk memories $D_1$–$D_5$ (or $D_6$–$D_{10}$) is always loaded, upon initialization of the mass memory apparatus, by the central processor $PR_1$ into the microprocessor $MPD_1$.

It will be understood that what has been described above for the writing method according to the invention relating to the first host adaptor and first disk adaptor is equally valid for the second host adaptor and second disk adaptor, $HA_2$ and $DA_2$, respectively.

At the end of operation III, it has been seen that the host, having received an acknowledgement signal from the adaptor $HA_1$, thinks that the operation of writing the block of data is performed in the disk memory addressed, although in reality this is not true. The mass memory apparatus $DMM_1$ then has the responsibility, as soon as this operation III is completed, of carrying out this operation of writing the block of data regardless of any functional accidents that may occur, whether they take the form of a malfunction of the host adaptors $HA_1$ or $HA_2$, disk adaptors $DA_1$ and $DA_2$, or the two control units $UC_1$ and $UC_2$, either separately or simultaneously, or one or the other of the two buses. It is specifically an essential object of the writing method according to the invention to carry out the writing of the data block integrally in the disk memory addressed in complete security, regardless of the aforementioned circumstances. For this reason, the method according to the invention is called a protected fast writing method. The various instances of malfunction or accidents in the functioning of the mass memory apparatus according to the invention occurring from the end of operation III on, with the consequences that this entails for the fast writing method, are described below.

If the host adaptor $HA_1$ becomes defective, the disk adaptor $DA_1$ is unaffected. It always has the data at its disposal in its memory buffer $MTD_1$ and it performs or completes the writing operation regardless of the instant at which $HA_1$ becomes defective.

If the disk adaptor $DA_1$ becomes defective, the data block to be written is sent by the first host adaptor $HA_1$ to the second disk adaptor by way of $B_1$ and $PR_1$ (it will be recalled that the first host adaptor $HA_1$ contains the entire data block to be written within its own host buffer $MTH_1$). The second disk adaptor $DA_2$ then, instead of the first disk adaptor, performs operations II, III, IV, with the disk adaptor $DA_2$ in dialog with the first central processor $PR_1$, via the bus $B_2$, for operations II and III.

When the mains power supply fails, the two power supplies $ALIM_1$ and $ALIM_2$ are then inoperative, each control unit $UC_1$ and $UC_2$ has its own protection battery $BAT_1$, $BAT_2$, so that the principle processor $PR_1$, once the loss of mains voltage is detected, organizes the transfer of the data block contained in the memory buffer $MTD_1$ to the backup disk memory $MSD_1$. It also organizes the transfer of all the necessary instructions for effective performance of the operation (the writing program that was contained in the memory adaptor $DA_1$) for writing on one of the rotary disks of the backup disk memory $MSD_1$. Once the operations of backup to this latter memory are completed, the main processor $PR_1$ requests disconnection of the battery $BAT_1$. It will be understood that operations analogous to these performed by the processor $PR_1$ are performed by the processor $PR_2$.

Once the mains power supply is back in operation, the main processor $PR_1$ detects this and returns the control unit $UC_1$ to the state in which it was immediately prior to the outage, by looking for the necessary information that has been backed up in the backup disk memory $MSD_1$. Thus the block of data to be written is re-sent to the memory buffer $MTD_1$, the writing program having been re-inscribed in the microprocessor $MPD_1$. The first processor communicates this resumption of the state prior to the power outage to the central host, and it can resume the operations II, III, IV mentioned above. It should be noted that the data block to be written is rewritten in its entirety in the disk memory in the region reserved for this purpose (specified by $H_1$ in its writing request), even if part of this block had been written there before the mains power outage.

In the event of a malfunction of the main processor $PR_1$, it is certainly possible to gain access to the backup disk memory $MSD_1$ from the other control unit, via the interface board $DEI_2$, both for backup operations and for operations of context reinitialization, and in the event of a power outage the operations are then performed under the control of the second main processor $PR_2$.

Similarly, if PR$_1$ is defective, any writing operation performed by the host adaptor and disk adaptor HA$_1$ and DA$_1$ is performed in association with the main processor PR$_2$.

If the Multibus II B$_1$ breaks down, the disk adaptor DA$_1$, still retaining the block to be written in its memory (in MTD$_1$), performs its writing task normally.

The structure of the memory apparatus DMM$_2$ according to the invention shown in FIG. 3 makes it possible not only to take care of the aforementioned functional accidents (in the host adaptor, memory adaptor, main processor, or power outage of the two control units or malfunction of the bus B$_1$ and/or B$_2$) but also to take care of the following accident, that is, a malfunction of one or the other of the control units while the writing method according to the invention is in progress, assuming that the information has been memorized in the host buffers and memory buffers.

Thus as can be seen in FIG. 3, as soon as the data block to be written has been inscribed in the host buffer MTH$_1$, this same block of data to be written is transmitted to the disk adaptor DA$_2$, where it is inscribed in the memory buffer MTD$_2$, the information traveling from the first host adaptor HA$_1$ to the second disk adaptor DA$_2$ by way of the bus B$_2$, whether or not UC$_1$ is functional. Thus, the data block having been transferred to the memory buffer of the disk adaptor DA$_2$, this disk adaptor now carries out the writing operation in association with the main processor PR$_2$ and the host adaptor HA$_1$, whether UC$_1$ is functional or defective.

FIG. 6 will now be described, which illustrates the dialog between the host adaptor HA$_1$ and the disk adaptor DA$_1$, when a block of data is to be written into one of the disk memories D$_1$-D$_5$ (D$_6$-D$_{10}$).

This dialog includes the following eight steps:

1) Step E1: The host adaptor receives the writing request from the host in the form of a command message CMD, which is sent in a stack of commands for instance located in the read-write memory of the microprocessor MPH$_1$. Within this command message, the microprocessor decodes the address of the disk memory in which the data block is to be written. This disk memory will be called the resource, for the sake of simplicity. As soon as the microprocessor MBH$_1$ has decoded the address of the resource, it constitutes a command message MSG, which is sent to the microprocessor of the disk adaptor DA$_1$. The next step follows.

2) Step E2: This command message, MSG CMD, is decoded by the microprocessor MPD$_1$, which verifies the validity of the message and requests reservation of the resource from the main processor PR$_1$. It then assigns one page (or more) of the memory buffer MTD$_1$ for later receiving the data block.

As soon as the main processor PR$_1$ notifies the disk adaptor of the reservation of the aforementioned resource, the microprocessor MPD$_1$ then sends a message to the host adaptor HA$_1$ requesting that this adaptor send it the information, that is, the block of data to be written. The next step follows.

3) Step E3: The microprocessor MPH then assigns a page of the host buffer MTH$_1$ and notifies the host H$_1$ that it is waiting for the transfer of the data block to the page of the aforementioned host buffer. It then sends a request for reservation of the memory buffer MTD$_1$ to the disk adaptor DA$_1$, which returns a message to the host adaptor indicating that the memory buffer MTD$_1$ has agreed. The next step follows.

4) Step E4: The host adaptor transmits the block of data to be written to the memory buffer of the disk adaptor, but the block of data to be written is still memorized in any case in the host buffer. Once this transfer is completed, the next operation follows.

5) Operation E5: The microprocessor MPD$_1$ constitutes a response message signifying that the transfer of the entire data block to be written has taken place normally. This response message is transmitted to the microprocessor MPH$_1$ of the host adaptor. Upon reception of this message the next operation follows.

6) Operation E6: The microprocessor MPH$_1$ then sends a message to the host system H$_1$ indicating that the transfer of the block of data to be written in the host buffer and memory buffer has taken place. The host then considers that the data block to be written has been written in the resource in question, even though this writing has not yet actually taken place.

For the host system H$_1$, it is seen that the access time to the reserved disk memory is thus masked, and it can re-use the zone in its central memory that it had expressly reserved for the data block to be written. The next operation follows.

7) Operation E7: Under the direction of the microprocessor MPD$_1$, the data block is written in one of the rotary disks of the resource in question. To do this, the writing program employed by this microprocessor cuts the data block to be written into sectors, all of which have the same length, which is currently usual in fixed-format disk memories, as indicated in FIG. 5b. The data are divided into sectors $S_i$, $S_j$, $S_k$, containing the same number of bytes (512, for example). In each sector $S_j$, a header HE$_j$, a data block DO$_j$ and a footer IC$_j$ are written successively into each sector $S_j$. The set of information of one sector is inscribed over all or some of one or more tracks (if the data block to be written is sufficiently long) of one of the rotary disks of the resource. The preamble contains information for physically locating the sector $S_j$ on the track in question of the magnetic disk, and the footer contains information for verifying the integrity of the data, to verify whether all the bytes of the sector $S_j$ that have been recorded are correct. This organization of writing information by sector, and its distribution among the sectors, is very well known and is currently used in conventional disk memories. Once writing of the data block in the disk of the resource in question is completed, this resource is released by the microprocessor MPD$_1$, as is the memory buffer MTD$_1$. The microprocessor in question then sends a release message to the adaptor HA$_1$. The final step follows.

8) Step E8: The microprocessor MPH$_1$ releases its host buffer MTH$_1$.

FIG. 5a will now be described.

In a particularly preferred embodiment of the invention, each of the interfaces DEI$_1$ and DEI$_2$ comprises an electronic memory, which is currently known as such, or as an electronic disk, to those skilled in the art.

The electronic disk DEI$_1$ includes a set of commands EC$_1$ and a memory plane PM.

The set of commands EC$_j$ is connected via a link L$_1$ to the backup disk memory MSD$_1$, which is connected by a link L$_2$ to the main processor PR$_2$.

The set of commands EC$_j$ includes in particular an interface IB$_1$ for communication with the bus B$_1$, an interface IB$_2$ for communication with the bus B$_2$, a command microprocessor MPE, and the memory M$_1$ associated with this microprocessor, as well as an interface $IF_1$ with the link $L_1$. These various elements exchange information by way of the internal bus $BI_1$ of the set of commands $EC_1$.

The memory plane PM is composed for example of two memory planes $P_1$ and $P_2$. The memory plane $P_1$ includes a plurality of RAM memory columns, for example, specifically the columns $IR_1, IR_j, \ldots, IR_n$. Similarly, the memory plane $P_2$ includes a plurality of semiconductor RAM memory columns, that is, $2R_1, \ldots 2R_j, \ldots, 2R_n$.

The information (data and addresses where the data are located inside the RAM memories) originating from or proceeding to the memory plane $P_1$ is transported on a bus $BDA_1$, while the information circulating between the two memory planes $P_1$ and $P_2$ is carried by a bus $BDA_2$ that is identical to the bus $BDA_1$. Each of these two buses is in fact composed of one data bus and one address bus. Inside the memory planes $P_1$ and $P_2$, each of the two buses $BDA_1$ and $BDA_2$ is subdivided into a sufficient number of branches to supply all the columns of each of these two planes.

The central processor $PR_2$ (the central processor $PR_1$ has an entirely identical structure) includes two interfaces for communication with the buses $B_1$ and $B_2$ respectively, that is, interfaces $IB_3$ and $IB_4$; a communication bus $BI_2$; a central microprocessor MPC; the memory $M_2$ associated with this microprocessor; and finally, an interface $IF_2$ with the link $L_2$.

The interfaces $IB_1, IB_2, IB_3, IB_4$ are of the same type as the interfaces $IBH_1, IBH_2, IBD_1, IBD_2$ (see above). The interfaces $IF_1$ and $IF_2$ are standardized IPI-2 interfaces. If it is desired to write information in the electronic disk $DEI_1$, the information travels over one of the two buses $B_1$ or $B_2$, passes via the interface $IB_1$ ($IB_2$) and is then transmitted to the memory $M_1$ associated with the microprocessor MPE. As a function of the available regions in one or the other of the memory planes $P_1$ and $P_2$, this microprocessor inscribes the information into them. Further details of the functioning of the electronic disk unit $DEI_1$ are given in French Patent Application No. 89.15914, filed on Dec. 1, 1989 by the present assignee and corresponding to U.S. application Ser. No. 07/620,471 of Daniel Carteau for "Protected Electronic Mass Memory Unit" filed Nov. 30, 1990, the subject matter of which is hereby incorporated by reference.

The fast writing method according to the invention is equally applicable to the electronic memory $DEI_1$. In the same way as in rotary disk memories, the data block to be written is divided into sectors $S_i, S_j, S_k$, containing the same number of bytes, and the set of information of one sector is inscribed at memory locations the addresses of which are in sequence, for example in one unit. In a preferred embodiment of the invention, the data are written in a 39-bit format, that is, 32 useful bits distributed among four bytes, with seven error correction bits ECC added; this error correction mode is conventionally used in dynamic RAMs.

To use the fast writing method of the invention in an electronic disk such as $DEI_1$, it is sufficient to substitute the set of commands $EC_1$ for the disk adaptor $DA_1$ in the entire above explanation; the microprocessor MPE then plays the same role as the microprocessor $MPD_1$ and the memory plane pM plays the same role as the host buffer $MTD_1$ of the host adaptor. Once the data have been written in the memory plane (and have thus also been written in the host buffer $MTH_1$), the backup disk memory $MSD_1$ is updated, in masked time (it can be seen that in the fast writing method, this backup disk memory plays the same role that the resource played in the above description of the fast writing method applied to disk memories).

It can be seen that the fast writing and data protection method is accordingly identically applicable to either conventional disk memories such as $D_1$–$D_5$ or electronic disks such as $DE_1$ or $DE_2$.

The mass memory apparatus according to the invention accordingly proposes a fast writing method that assures complete protection of the data, since the data inscribed there are perfectly well protected from various functional accidents (see above) that may occur.

We claim:

1. A method of fast writing of information for at least one mass memory apparatus ($DMM_1$) including a plurality of mass memory units and belonging to an information processing system including at least one central host ($H_1$, $H_2$), a first and second control unit ($UC_1$, $UC_2$), connected to a first and second parallel bus ($B_1$, $B_2$), wherein said control units (UC1, UC2) include a first and second central processor ($PR_1$ and $PR_2$), respectively, the central host ($H_1$, $H_2$) being connected to each of the buses via at least one first host adaptor ($HA_1$, $HA_2$) of the first control unit ($UC_1$, $UC_2$), and at least a first and second mass memory device for controlling and organizing writing of information on each mass memory unit, said mass memory device being connected to at least one of said first and second parallel buses, wherein said at least one host adaptor, the mass memory device and the mass memory units are on the same data path; comprising the steps of I) storing a block of data to be written, sent from the central host, in the first host adaptor ($HA_1$, $HA_2$) and then in the first mass memory device ($DA_1$, $DA_2$) by communication between the central host ($H_1$, $H_2$) and the host adaptors ($HA_1$, $HA_2$), and between the host adaptors and the mass memory device ($DA_1$, $DA_2$), respectively;

II) causing the first mass memory device ($DA_1$, $DA_2$) to send a request to the first central processor for reservation of the mass memory ($D_1$–$D_5$) for writing information therein;

III) informing the host adaptor ($HA_1$), by signal from the mass memory device, that the reservation request has been made, and sending an acknowledgement signal from the host adaptor $HA_1$ to the central host ($H_1$); and IV) writing the block of data in its entirety in the mass memory under the control of the first mass memory device ($DA_1$), in all cases when the first mass memory adapter is functioning properly, and by the second mass memory device ($DA_2$) when the first mass memory device ($DA_1$) is defective, wherein if said first mass memory device is defective the block of data is transferred to said second mass memory device.

2. The method of claim 1, wherein the first step I includes the following successive steps:

1) sending a writing request from the host $H_1$ to the first host adaptor ($HA_1$);

2) sending a transfer request from the host adaptor ($HA_1$) to the host to transfer the block of data to be written;

3) storing the block of data in its entirety, first in a first host buffer ($MTH_1$) within the first host adaptor ($HA_1$, $HA_2$), and then also in a first memory buffer (MTD₁) within the first memory device (DA₁, DA₂).

3. The method of claim 1, wherein when the first mass memory adaptor (DA₁) is defective after step III, said method includes the steps of:
   a) sending the block of data by the host adaptor (HA₁) to the second mass memory device (DA₂); and
   b) causing the second mass memory device (DA₂) to control the performance of steps II, III, IV, instead of having the steps controlled by the first memory device (DA₁).

4. The method of claim 1, wherein the first control unit (UC₁) includes at least one first backup rotary disk memory (MDS₁) connected both to the first central processor (PR₁) of said first control unit and to an interface board (DEI₂) of the second control unit (UC₂) for interfacing with the first and second buses (B₁, B₂), and said second control unit further includes at least one second backup rotary disk memory (MSD₂) connected both to the second central processor (PR₂) of the second control unit and to an interface board (DEI₁) of the first control unit for interfacing with the first and second buses connected to the first control unit, independent power supplies for said first and second control units, each control unit having its own protection battery, such that if the power supplies are out or defective during step IV, the following steps are performed:
   V) causing the first central processor (PR₁) to extract the data block to be written, contained in the first memory buffer (MTD₁), and transferring the extracted data integrally to the backup disk memory (MSD₁);
   VI) then causing the first central processor to disconnect the protection battery (BAT₁).

5. The method of claim 1, characterized in that if one or the other of the two buses is defective, during step IV, continuing step IV, under the direction of the first mass memory device (DA₁).

6. The method of claim 1, characterized in that when the first host adaptor is connected to both of the two buses (B₁, B₂), and the first and second memory devices (DA₁; DA₂) are connected, one to the first bus (B₁), and the other to the second bus (B₂), respectively, the second mass memory device performs steps I-IV, V-IX, instead of the first mass memory device.

7. The method of claim 2, characterized in that if one or the other of the two buses is defective, during step IV, continuing step IV, under the direction of the first mass memory device (DA₁).

8. The method of claim 2, characterized in that when the first host adaptor is connected to both of the two buses (B₁, B₂), and the first and second memory devices (DA₁; DA₂) are connected, one to the first bus (B₁), and the other to the second bus (B₂), respectively, the second mass memory device performs step I-IV, V-IX, instead of the first mass memory device.

9. The method of claim 2, wherein when the first mass memory device (DA₁) is defective after steps III, said method includes the steps of:
   a) sending the block of data by the host adaptor (HA₁) to the second mass memory device (DA₂); and
   b) causing the second mass memory device (DA₂) to control the performance of steps II, III, IV, instead of having the steps controlled by the first memory device (DA₁).

10. The method of claim 2, wherein the first control unit (UC₁) includes at least one first backup rotary disk memory (MDS₁) connected both to the first central processor (PR₁) of said first control unit and to an interface board (DEI₂) of the second control unit (UC₂) for interfacing with the first and second buses (B₁, B₂), and said second control unit further includes at least one second backup rotary disk memory (MSD₂) connected both to the second central processor (PR₂) of the second control unit and to an interface board (DEI₁) of the first control unit for interfacing with the first and second buses connected to the first control unit, independent power supplies for said first and second control units, each control unit having its own protection battery, such that if the power supplies are out or defective during step IV, the following steps are performed:
    V) causing the first central processor (PR₁) to extract the data block to be written, contained in the first memory buffer (MTD₁), and transferring the extracted data integrally to the backup disk memory (MSD₁);
    VI) then causing the first central processor to disconnect the protection battery (BAT₁).

11. The method of claim 10, characterized in that when the first host adaptor is connected to both of the two buses (B₁, B₂), and the first and second memory devices (DA₁; DA₂), are connected, one to the first bus (B₁), and the other to the second bus (B₂), respectively, the second mass memory device performs step I-IV, V-IX, instead of the first mass memory device.

12. The method of claim 10, characterized in that as soon as the power supplies are restored to normal operation, the following steps are performed
    VII) initializing the first and second control units (UC₁, UC₂);
    VIII) informing the central host (H₁) from the first processor of reinitiating of the first and second control units and transferring the data contained in the backup disk memory (MSD₁) to a first host buffer (MTH₁) and to a first memory buffer (MTD₁); and
    IX) repeating step II, III and IV.

13. The method of claim 10, wherein if the first processor (PR₁) is defective, repeating steps V and VI by the second processor (PR₂), and vice versa.

14. The method of claim 12, characterized in that when the first host adaptor is connected to both of the two buses (B₁, B₂), and the first and second memory devices (DA₁; D₂) are connected, one to the first bus (B₁), and the other to the second bus (B₂), respectively, the second mass memory device performs step I-IV, V-IX, instead of the first mass memory device.

15. The method of claim 12, wherein if the first processor (PR₁) is defective, repeating the steps VII, VIII, IX by the second processor (PR₂), and vice versa.

16. The method of claim 3, wherein the first control unit (UC₁) includes at least one first backup rotary disk memory (MSD₁) connected both to the first central processor (PR₁) of said first control unit and to an interface board (DEI₂) of the second control unit (UC₂) for interfacing with the first and second buses (B₁, B2), and said second control unit further includes at least one second backup rotary disk memory (MSD₂) connected both to the second central processor (PR₂) of the second control unit and to an interface board (DEI₁) of the first control unit for interfacing with the first and second buses connected to the first control unit, independent power supplies for said first and second control units, each control unit having its own protection battery, such that if the power supplies are out or defective during step IV, the following steps are performed:
- V) causing the first processor ($PR_1$) to extract the data block to be written, contained in the first memory buffer ($MTD_1$), and transferring the extracted data integrally to the backup disk memory ($MSD_1$);
- VI) then causing the first central processor to disconnect the protection battery ($BAT_1$).

17. The method of claim 16, wherein if the first processor ($PR_1$) is defective, repeating steps V and VI by the second processor ($PR_2$), and vice versa.

18. The method of claim 16, characterized in that as soon as the power supplies are restored to normal operation, the following steps are performed
- VI) initializing the first and second control units ($UC_1$, $UC_2$);
- VIII) informing the central host ($H_1$) from the first processor of reinitiating of the first and second control units and transferring the data contained in the backup disk memory ($MSD_1$) to a first host buffer ($MTH_1$) and to a first memory buffer ($MTD_1$); and
- IX) repeating steps II, III and IV.

19. The method of claim 16, characterized in that when the first host adaptor is connected to both of the two buses ($B_1$, $B_2$), and the first and second memory devices ($DA_1$; $DA_2$) are connected, one to the first bus ($B_1$), and the other to the second bus ($B_2$), respectively, the second mass memory device performs step I–IV, V–IX, instead of the first mass memory device.

20. The method of claim 18, wherein if the first processor ($PR_1$) is defective, repeating steps VII, VIII, IX by the second processor ($PR_2$), and vice versa.

21. The method of claim 18, characterized in that when the first host adaptor is connected to both of the two buses ($B_1$, $B_2$), and the first and second memory devices ($DA_1$; $D_2$) are connected, one to the first bus ($B_1$), and the other to the second bus ($B_2$), respectively, the second mass memory device performs steps I–IV, V–IX, instead of the first mass memory device.

22. The method of claim 4, wherein if the first processor ($PR_1$) is defective, repeating steps V and VI by the second processor ($PR_2$), and vice versa.

23. The method of claim 4, characterized in that as soon as the power supplies are restored to normal operation, the following steps are performed
- VII) initializing the first and second control units ($UC_1$, $UC_2$);
- VIII) informing the central host ($H_1$) from the first processor of reinitiating of the first and second control units and transferring the data contained in the backup disk memory ($MSD_1$) to a first host buffer ($MTH_1$) and to a first memory buffer ($MTD_1$); and
- IX) repeating steps II, III and IV.

24. The method of claim 4, characterized in that when the first host adaptor is connected to both of the two buses ($B_1$, $B_2$), and the first and second memory devices ($DA_1$; $DA_2$) are connected, one to the first bus ($B_1$), and the other to the second bus ($B_2$), respectively, the second mass memory device performs steps I–IV, V–IX, instead of the first mass memory device.

25. The method of claim 23, wherein if the first processor ($PR_1$) is defective, repeating steps V and VI by the second processor ($PR_2$), and vice versa.

26. The method of claim 23, characterized in that when the first host adaptor is connected to both of the two buses ($B_1$, $B_2$), and the first and second memory devices ($DA_1$; $DA_2$) are connected, one to the first bus ($B_1$), and the other to the second bus ($B_2$), respectively, the second mass memory device performs steps I–IV, V–IX, instead of the first mass memory device.

* * * * *